(12) United States Patent
Imai

(10) Patent No.: US 7,365,353 B2
(45) Date of Patent: Apr. 29, 2008

(54) RADIATION IMAGE DETECTOR

(75) Inventor: Shinji Imai, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 37 days.

(21) Appl. No.: 11/438,221

(22) Filed: May 23, 2006

(65) Prior Publication Data

US 2006/0261299 A1 Nov. 23, 2006

(30) Foreign Application Priority Data

May 23, 2005 (JP) .............................. 2005-149591
May 23, 2005 (JP) .............................. 2005-149592

(51) Int. Cl.
*G01N 23/04* (2006.01)

(52) U.S. Cl. .................. 250/591; 250/370.14

(58) Field of Classification Search ................ 250/591, 250/370.14

See application file for complete search history.

(56) References Cited

U.S. PATENT DOCUMENTS 6,566,676 B1 *  5/2003  Kuwabara ................... 250/591
6,707,059 B1 *  3/2004  Ogawa ........................ 250/591
6,770,901 B1     8/2004  Ogawa et al.
7,297,974 B2 * 11/2007  Imai ............................ 250/591

FOREIGN PATENT DOCUMENTS

JP   2003-031836 A   1/2003
JP   2003-218335 A   7/2003

* cited by examiner

*Primary Examiner*—David Porta
*Assistant Examiner*—Jessica L Eley
(74) *Attorney, Agent, or Firm*—Sughrue Mion, PLLC

(57) ABSTRACT

A radiation image detector with improved readout efficiency. The detector records a radiation image by generating and storing electric charges when irradiated with radiation, and the image is read out by irradiating readout light. The detector includes first line electrodes and second line electrodes disposed alternately with each other. An opaque line insulator that blocks the readout light is provided on each side face extending in the longitudinal direction of each second line electrode. The insulator has a width smaller than the distance between the first and second line electrodes. This arrangement allows the electric charges in the area of the photoconductive layer adjacent to the side faces of the first line electrodes to be fully discharged, and the electric charges in the area of the photoconductive layer adjacent to the side faces of the second line electrodes to be prevented from discharging.

5 Claims, 8 Drawing Sheets

RADIATION IMAGE DETECTOR

BACKGROUND OF THE INVENTION

1. Field of the Invention

The present invention relates to a radiation image detector constructed to receive radiation representing a radiation image to record the radiation image therein, and to be scanned with readout light to output signals in proportion to the radiation image recorded therein.

2. Description of the Related Art

Various types of radiation image detectors are proposed and put into practical use in the medical and other industrial fields. These detectors generate electric charges when irradiated with radiation transmitted through a subject and record a radiation image of the subject by storing the electric charges.

One of such radiation image detectors is proposed, for example, in U.S. Pat. No. 6,770,901. The detector is constituted by a layer structure that includes the following layers in the order listed below: a first electrode layer that transmits radiation; a recording photoconductive layer that generates electric charges when irradiated with radiation; a charge transport layer that acts as an insulator against the latent image charges and as a conductor for the electric charges of opposite polarity to the latent image charges; a readout photoconductive layer that generates electric charges when irradiated with readout light; and a second electrode layer that includes linearly extending transparent line electrodes that transmit readout light and linearly extending opaque line electrodes that block the readout light disposed alternately in parallel with each other.

When recording a radiation image using the radiation image detector formed in the manner as described above, radiation transmitted through a subject is irradiated on the detector from the side of the first electrode layer with a negative high voltage being applied to the first electrode layer. The radiation irradiated on the detector in the manner described above is transmitted through the first electrode layer and irradiated on the recording photoconductive layer. Then, electric charge pairs are generated in the area of the recording photoconductive layer where the radiation is irradiated, and the positive charges of the electric charge pairs move to the negatively charged first electrode layer, where they combine with the negative charges charged thereon and disappear. In the mean time, the negative charges of the electric charge pairs generated in the manner as described above move toward the positively charged second electrode layer, but they are blocked by the charge transport layer since it acts as an insulator against negative charges and accumulated at the interface between the recording photoconductive layer and the charge transport layer called storage section. This accumulation of the negative charges in the storage section constitutes the recording of the radiation image.

When reading out the radiation image recorded in the manner as described above, readout light is irradiated on the detector from the side of the second electrode layer. The readout light irradiated on the detector is transmitted through the transparent line electrodes of the second electrode layer and irradiated on the readout photoconductive layer, whereby electric charge pairs are generated in the readout photoconductive layer. The positive charges of the electric charge pairs generated in the readout photoconductive layer combine with the negative charges stored in the storage section, while the negative charges of the electric charge pairs combine with the positive charges charged on the transparent line electrodes, whereby electric currents are detected by current detection amplifiers connected to the transparent line electrodes, which are then converted to voltage values and outputted as image signals.

According to the radiation image detector having opaque electrodes that block the readout light, the radiation irradiated toward the area of the readout photoconductive layer corresponding to each of the opaque line electrodes is blocked when the image is read out. This prevents the discharge of the electric charges between the storage section having the latent image stored therein and the opaque line electrodes, so that the amount of electric charges in the area of the readout photoconductive layer adjacent to each of the transparent line electrodes may relatively be increased compared with the case where no such opaque line electrode is provided. Thus, the amount of signal charges obtainable from the radiation image detector to outside through the transparent line electrodes may relatively be increased compared with the case where no such opaque line electrode is provided, whereby readout efficiency is improved.

Here, Japanese Unexamined Patent Publication No. 2003-031836 discloses one of the methods for forming the opaque line electrodes. In the method, an opaque film 45c that blocks readout light is provided on the side of each of the transparent line electrodes 45b from which the readout light is irradiated as shown in FIG. 15A. The radiation image detector 40 shown in FIG. 15A is constituted by a layer structure that includes the following layers in the order listed below: a first electrode layer 41, a recording photoconductive layer 42, a charge transport layer 43, a readout photoconductive layer 44, a second electrode layer 45, and a glass substrate 47. The second electrode layer 45 includes transparent line electrodes 45a that transmit readout light, and opaque line electrodes, each constituted by a line electrode 45b that transmits the readout light and an opaque film 45c that blocks the readout light. An insulation layer 48 is provided between the transparent line electrodes 45a line electrodes 45b and the opaque films 45c.

In the radiation image detector 40 according to the Japanese Unexamined Patent Publication No. 2003-031836, each of the opaque film 45c is provided such that it covers the region corresponding to the area of the readout photoconductive layer 44 between the side faces of two adjacent transparent line electrodes 45a as shown in FIG. 15A, so that electric charges in the area of the readout photoconductive layer 44 adjacent to each of the transparent line electrodes 45a are not fully discharged, causing degradation in the readout efficiency by that much.

Further, Japanese Unexamined Patent Publication No. 2003-218335 proposes a method for forming the opaque line electrodes by providing opaque films 55c or 65c on the side of the transparent line electrodes 55b or 65b from which readout light is irradiated as shown in FIG. 15B or 15C.

In the radiation image detector 50 or 60 according to the unexamined patent publication described above, each opaque film 55c or 65c is provided such that it extends only to the side edges of each line electrode 55b or 65b as shown in FIG. 15B or 15C, so that the electric charges in the area of the readout photoconductive layer 44 adjacent to each of the line electrodes 55b or 65b are discharged, causing degradation in the readout efficiency by that much. The radiation image detector 50 shown in FIG. 15B is constituted by a layer structure that includes the following layers in the order listed below: a first electrode layer 51, a recording photoconductive layer 52, a charge transport layer 53, a readout photoconductive layer 54, a second electrode layer 55, and a glass substrate 57. The second electrode layer 55 includes transparent line electrodes 55a that transmit readout light and opaque line electrodes, each constituted by a line electrode 55b that transmits readout light and an opaque film 55c that blocks readout light. The radiation image detector 60 shown in FIG. 15C is constituted by a layer structure that includes the following layers in the order listed below: a first electrode layer 61, a recording photoconductive layer 62, a charge transport layer 63, a readout photoconductive layer 64, a second electrode layer 65, and a glass substrate 67. The second electrode layer 65 includes transparent line electrodes 65a that transmit readout light and opaque line electrodes, each constituted by a line electrode 65b that transmits the readout light and an opaque film 65c that blocks readout light. Further an insulation layer 68 is provided between the transparent line electrodes 65a and opaque line electrodes.

In the mean time, in the radiation image detectors described above, residual charges remaining in the storage section are erased after the image is read out in the manner as described above. More specifically, erasing light is irradiated on the detector from the side of the second electrode layer, which causes electric charge pairs to be generated in the readout photoconductive layer, and charges of either polarity combine with the residual charges remaining in the storage section, whereby the residual charges are erased.

However, for example, as in the radiation image detector 60 shown in FIG. 15C, if the insulation layer 68 is provided on the surface of the opaque line electrodes, the electric charges of the other polarity of the electric charge pairs generated by the erasing light in the manner as described above remain on the insulation layer 68 as shown in FIG. 15C. These charges remaining on the insulation layer 68 appear as a residual image on the image obtained in the next radiation image recording and reading out process.

The present invention has been developed in view of the circumstances described above, and it is an object of the present invention to provide a radiation image detector including opaque line electrodes that block readout light with improved readout efficiency.

It is a further object of the present invention to provide a radiation image detector capable of preventing the residual image described above, as well as improving the readout efficiency.

SUMMARY OF THE INVENTION

A first radiation image detector of the present invention comprises a layer structure that includes the following layers in the order listed below:

a charge storage layer that generates and stores electric charges when irradiated with a recording electromagnetic wave representing a radiation image;

a photoconductive layer that generates electric charges when irradiated with readout light; and an electrode layer including a plurality of first line electrodes that transmits the readout light and a plurality of second line electrodes that blocks the readout light disposed alternately in parallel with each other at a predetermined distance, wherein:

each of the plurality of second line electrodes includes an opaque line insulator that blocks the readout light on each side face extending in the longitudinal direction thereof; and the opaque line insulator has a width which is smaller than the distance between the first and second line electrodes.

In the first radiation image detector of the present invention, a configuration may be adopted in which the photoconductive layer further generates electric charges when irradiated with erasing light for erasing residual charges remaining in the charge storage layer, and the opaque line insulator transmits the erasing light.

A second radiation image detector of the present invention comprises a layer structure that includes the following layers in the order listed below:

a charge storage layer that generates and stores electric charges when irradiated with a recording electromagnetic wave representing a radiation image;

a photoconductive layer that generates electric charges when irradiated with readout light; and an electrode layer including a plurality of first line electrodes that transmits the readout light and a plurality of second line electrodes that blocks the readout light disposed alternately in parallel with each other at a predetermined distance, wherein:

each of the plurality of second line electrodes includes an opaque line insulator that blocks the readout light only at a side region adjoining each side face extending in the longitudinal direction thereof, and a third line electrode for electrically connecting the area of the photoconductive layer adjacent to the opaque line insulators along the upper face thereof and the upper face of the opaque line insulators; and a maximum width of the opaque line insulator measured from the side face extending in the longitudinal direction of the second line electrode is smaller than the distance between the first and second line electrodes.

In the second radiation image detector of the present invention, a configuration may be adopted in which the photoconductive layer further generates electric charges when irradiated with erasing light for erasing residual charges remaining in the charge storage layer, and the opaque line insulator transmits the erasing light.

Further, a configuration may be adopted in which the third line electrode transmits the erasing light.

According to the first radiation image detector of the present invention, each of the plurality of second line electrodes includes an opaque line insulator that blocks the readout light on each side face extending in the longitudinal direction thereof, and each of the opaque line insulators is formed such that it has a width which is smaller than the distance between the first and second line electrodes. This allows the electric charges in the area of the photoconductive layer adjacent to the side faces of each of the first line electrodes to be fully discharged, and the electric charges in the area of the photoconductive layer adjacent to the side faces of each of the second line electrodes to be prevented from discharging, whereby the readout efficiency is improved.

Further, in the first radiation image detector described above, residual charges remaining in the storage section are erased after the radiation image is read out. More specifically, erasing light is irradiated on the detector from the side of the second electrode layer, which causes electric charges to be generated in the photoconductive layer, and electric charges of either polarity combine with the residual charges remaining in the storage section, whereby the residual charges are erased.

Accordingly, if a configuration is adopted in which each of the opaque line insulators transmits the erasing light, the erasing process may be performed satisfactorily without interruption of the erasing light by the opaque line insulators.

According to the second radiation image detector of the present invention, each of the plurality of second line electrodes includes an opaque line insulator that blocks the readout light at a side region adjoining each side face extending in the longitudinal direction thereof, and each of the opaque line insulators is formed such that the maximum width thereof measured from the side face extending in the longitudinal direction of the second line electrode is smaller than the distance between the first and second line electrodes. This allows the electric charges in the area of the photoconductive layer adjacent to the side faces of each of the first line electrodes to be fully discharged, and the electric charges in the area of the photoconductive layer adjacent to the side faces of each of the second line electrodes to be prevented from discharging, whereby the readout efficiency is improved. Further, the region where each of the opaque line insulators is provided is limited to the side region adjoining each side face of each of the second line electrodes described above, and a third line electrode is provided along the upper face of each of the second line electrodes and the upper face of the adjoining opaque line insulators. This allows the electric charges in the area of the photoconductive layer adjacent to each of the third line electrode to be discharged by the erasing light irradiated thereon, thus the residual charges are erased satisfactorily.

DESCRIPTION OF THE PREFERRED EMBODIMENTS

Figure 1:
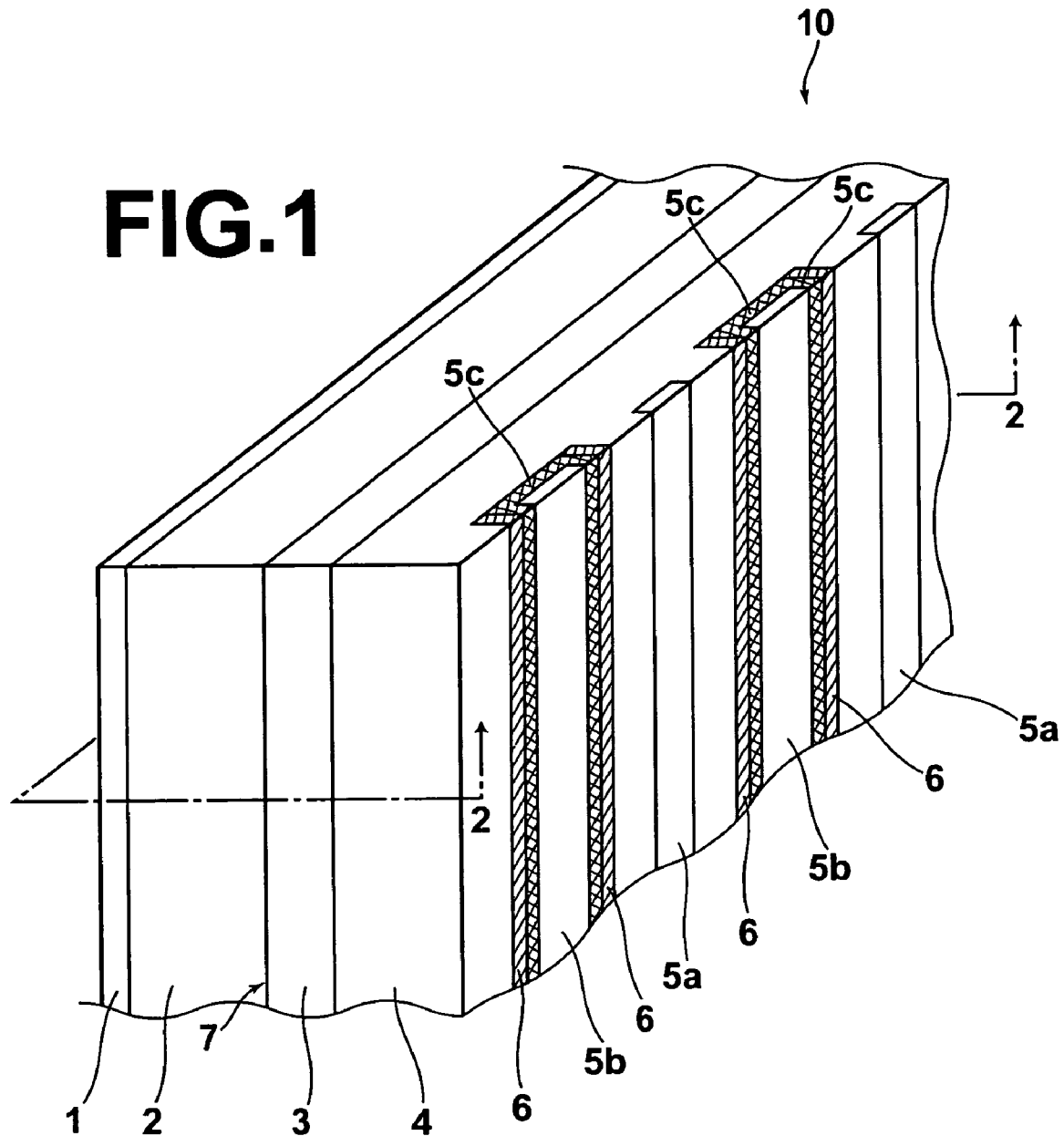
FIG. 1 is a schematic diagram of the radiation image detector according to a first embodiment of the present invention.

Hereinafter, the radiation image detector according to a first embodiment of the present invention will be described with reference to accompanying drawings. FIG. 1 is a perspective view of the present radiation image detector, and FIG. 2 is a cross-sectional view thereof taken along the line 2-2 in FIG. 1.

Figure 2:
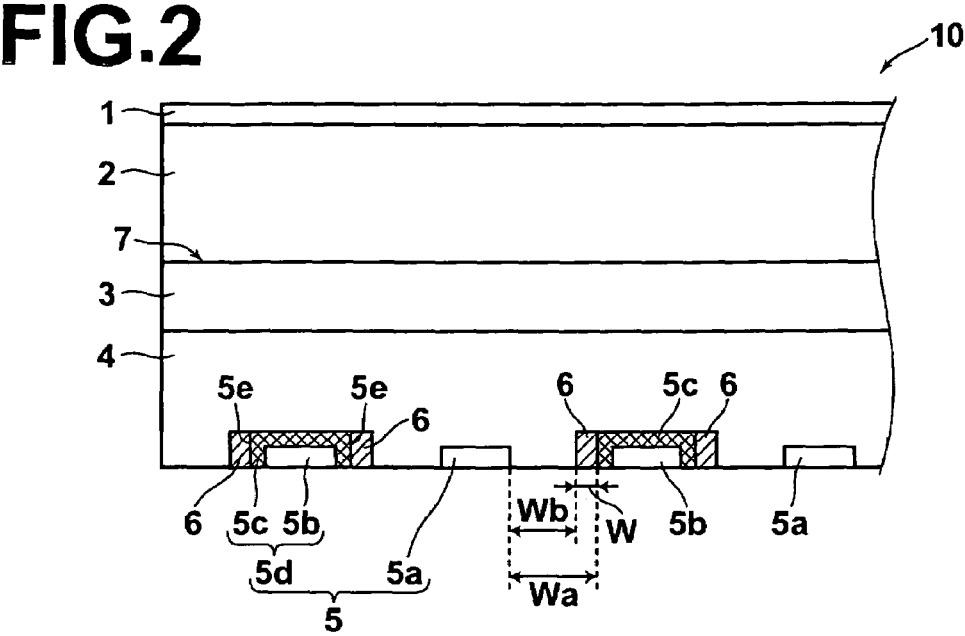
FIG. 2 is a cross-sectional view of the radiation image detector shown in FIG. 1 taken along the line 2-2 of FIG. 1.

As shown in FIGS. 1 and 2, the present radiation image detector 10 is constituted by a layer structure that includes the following layers in the order listed below: a first electrode layer 1 that transmits radiation representing a radiation image; a recording photoconductive layer 2 that generates electric charges when irradiated with the radiation transmitted through the first electrode layer 1; a charge transport layer 3 that acts as an insulator against the charges of either polarity and as a conductor for the charges of the other polarity generated in the recording photoconductive layer 2; a readout photoconductive layer 4 that generates electric charges when irradiated with readout light; and a second electrode layer 5 including a plurality of first line electrodes 5a that transmits the readout light, and a plurality of second line electrodes 5d that blocks the readout light, each of which is disposed between the first line electrodes 5a. In addition, a storage section 7 for storing the electric charges generated in the recording photoconductive layer 2 is formed between the recording photoconductive layer 2 and charge transport layer 3. Thus, a charge storage layer, which generates and stores electric charges when irradiated with a recording electromagnetic wave representing a radiation image, includes the first electrode layer 1, the recording photoconductive layer 2, the charge transport layer 3, and the storage section 7. The layers described above are built up on a glass substrate from the second electrode layer 5, but the glass substrate is omitted in FIGS. 1 and 2.

The first electrode layer 1 may be made of any material as long as it transmits radiation. For example, a NESA film (SnO2), ITO (Indium Tin Oxide), IDIXO (Indemitsu Indium X-metal Oxide, Idemitsu Kosan Co., Ltd.), which is a transparent metal oxide of amorphous state, or the like with a thickness in the range from around 50 to around 200 nm may be used. Alternatively, Al, or Au with a thickness of 100 nm may also be used.

The second electrode layer 5 includes the first line electrodes 5a and the second line electrodes 5d as described above. In addition, the first line electrodes 5a and the second line electrodes 5d are disposed alternately in parallel at a predetermined distance.

The first line electrode 5a is made of an electrically conductive material which transmits the readout light and erasing light to be described later. It may be made of any material as long as it has the properties described above. Such materials include, for example, ITO and IDIXO as used for the first electrode layer 1. Alternatively, the electrode 5a may be formed with a metal such as Al, Cr, or the like with a thickness that allows the readout light and the erasing light to be transmitted (e.g., around 10 nm).

The second line electrode 5d is constituted by a transparent line electrode 5b and an opaque film 5c that covers the upper and side faces of the transparent line electrode 5b. The transparent line electrode 5b may be formed with ITO or IDIXO as in the first line electrode 5a. The opaque film 5c may be formed, for example, by metal plating using Ni or Au. Alternatively, the second line electrode 5d may be formed with a material that blocks the readout light, such as Al or Cr, with a thickness which is sufficient to block the readout light, instead of forming the second line electrode 5*d* by providing the opaque film 5*c* over the transparent line electrode 5*b* as in the present radiation image detector 10.

Figure 8:
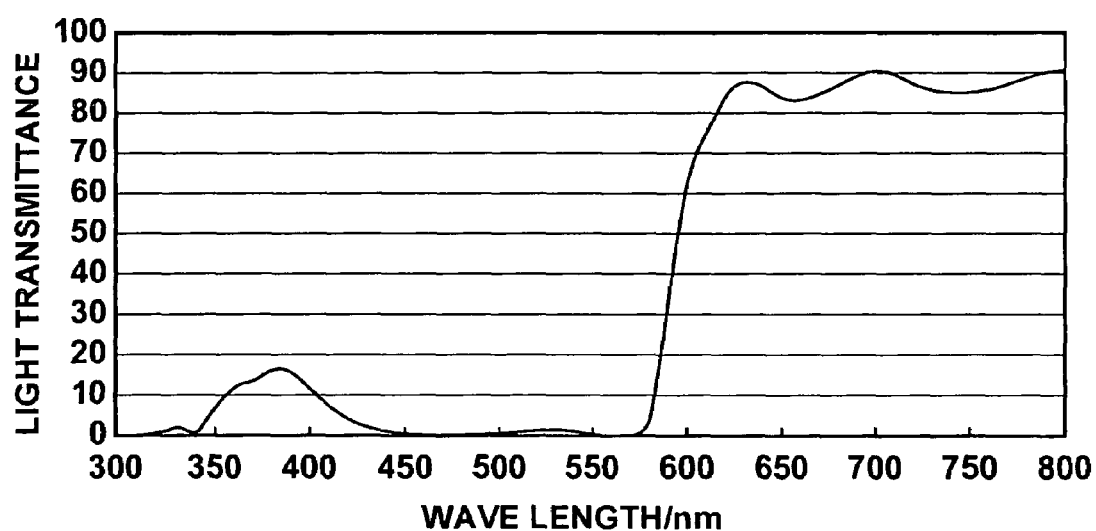
FIG. 8 is a graph illustrating an example light transmittance curve of a material used for the opaque line insulator.

In the present radiation image detector 10, an opaque line insulator 6 that blocks the readout light is provided on each side face 5*e* extending in the longitudinal direction of each second line electrode 5*d*. The opaque line insulator 6 is provided along each second line electrode 5*d*. The opaque line insulator 6 is made of an electrically insulative material which blocks the readout light and transmits the erasing light. The opaque line insulator 6 may be made of any material as long as it has the properties described above. If, for example, the readout light is blue light having a wavelength in the range from 400 nm to 480 nm, and the erasing light is red light having a wavelength in the range from 580 to 700 nm, a red insulation material, which is in complementary relationship with blue, may be used. Such materials include, for example, acrylate resin with diaminoanthraquino nilred dispersed therein, and the like. A preferred characteristic of the light transmittance of a material used for the opaque line insulator 6 when blue light is used as the readout light is shown in FIG. 8. If the readout light is red light having a wavelength in the range from 580 nm to 700 nm, and the erasing light is blue light having a wavelength in the range from 400 to 480 nm, a blue insulation material, which is in complementary relationship with red, may be used. Such material includes, for example, acrylate resin with copper phthalocyanine dispersed therein, and the like. That is, the materials that may be used for the opaque line insulator 6 are not limited to those described above, and any insulation material having the same color as the erasing light, which is in complementary color relationship with the wavelength of the readout light, may be used.

Further, the opaque line insulator 6 has a width W which is smaller than the distance Wa between the first line electrode 5*a* and the second line electrode 5*d*. Here, the distance Wb between the first line electrode 5*a* and the opaque line insulator 6 is preferable to be greater than the wavelength of the readout light, and is more preferable to be around 2.5 μm. The width W of the opaque line insulator is preferable to be greater than or equal to the wavelength of the readout light. For example, if blue light is used as the readout light, the width W described above is preferable to be in the range approximately from 2 μm to 3 μm, and is more preferable to be around 2.5 μm. That is, the width W is preferable to be approximately five times as great as the wavelength of the readout light.

The recording photoconductive layer 2 may be made of any material as long as it generates electric charges when irradiated with radiation. Here, a material including a-Se that has superior properties, such as relatively high quantum efficiency for radiation and high dark resistance, as the major component is used. The thickness of the recording photoconductive layer 2 is preferable to be around 500 μm.

As for the material of the charge transport layer 3, for example, a material having a greater difference in charge mobility between the charges charged on the first electrode layer 1 and the charges having opposite polarity when a radiation image is recorded (for example, not less than 102, more preferably, not less than 103), is preferable. In this respect, organic compounds such as polyN-vinylcarbazole (PVK), N,N'-diphenyl-N,N'-bis(3-methylphenyl)-[1,1'-biphenyl]-4,4'-dia mine (TPD), discotic liquid crystal, and the like, or semiconductor materials such as TPD-dispersed polymers (polycarbonate, polystyrene, PVK), a-Se doped with 10 to 200 ppm of Cl, and the like are preferably used.

The readout photoconductive layer 4 may be made of any material as long as it generates electric charges when irradiated with the readout light or erasing light. For example, photoconductive materials that consist mainly of at least one of the materials selected from the group of a-Se, Se—Te, Se—As—Te, nonmetal phthalocyanine, metal phthalocyanine, MgPc (Magnesium phthalocyanie), VoPc (phase II of Vanadyl phthalocyanine), CuPc (Cupper phthalocyanine), and the like are preferably used. The thickness of the readout photoconductive layer 4 is preferable to be in the range from 0.1 μm to 1.0 μm.

Hereinafter, the operation of the present radiation image detector will be described.

Figure 3A:
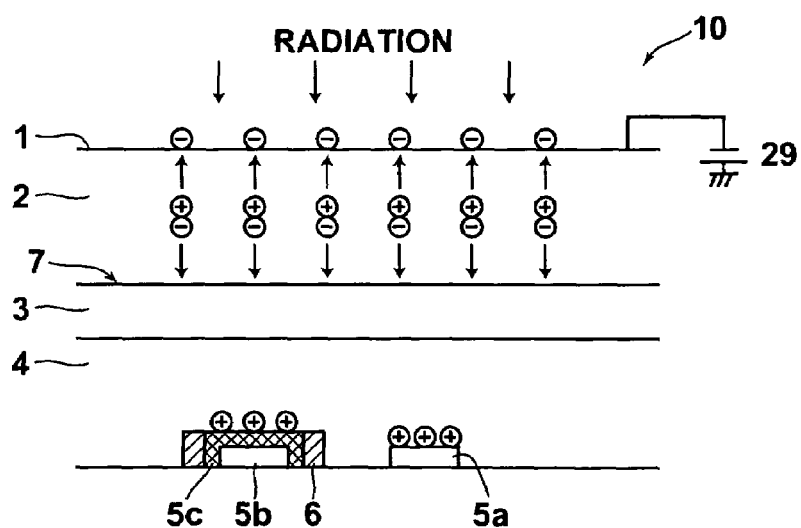
FIGS. 3A and 3B are explanatory diagrams explaining the operation of the radiation image detector shown in FIG. 1 when a radiation image is recorded thereon.

First, radiation is irradiated from a radiation source toward a subject with a negative high voltage being applied from a high voltage source 29 to the first electrode layer 1 of the radiation image detector 10 as shown in FIG. 3A, and the radiation transmitted through the subject and representing a radiation image of the subject is irradiated on the radiation image detector 10 from the side of the first electrode layer 1.

Figure 3B:
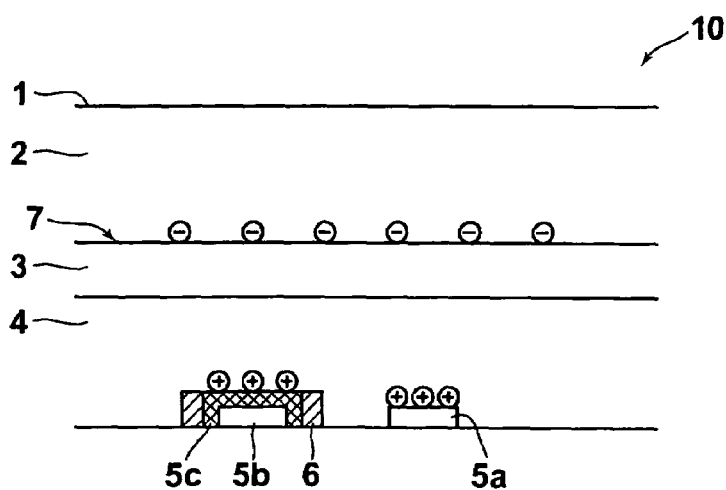

Then, the radiation irradiated on the radiation image detector 10 is transmitted through the first electrode layer 1, and irradiated on the recording photoconductive layer 2, which causes electric charge pairs to be generated in the recording photoconductive layer 2. The positive charges of the electric charge pairs combine with the negative charges charged on the first electrode layer 1 and disappear, while the negative charges of the electric charge pairs are stored in the storage section 7 formed at the interface between the recording photoconductive layer 2 and charge transport layer 3 as latent image charges, whereby the radiation image is recorded (FIG. 3B).

Figure 4:
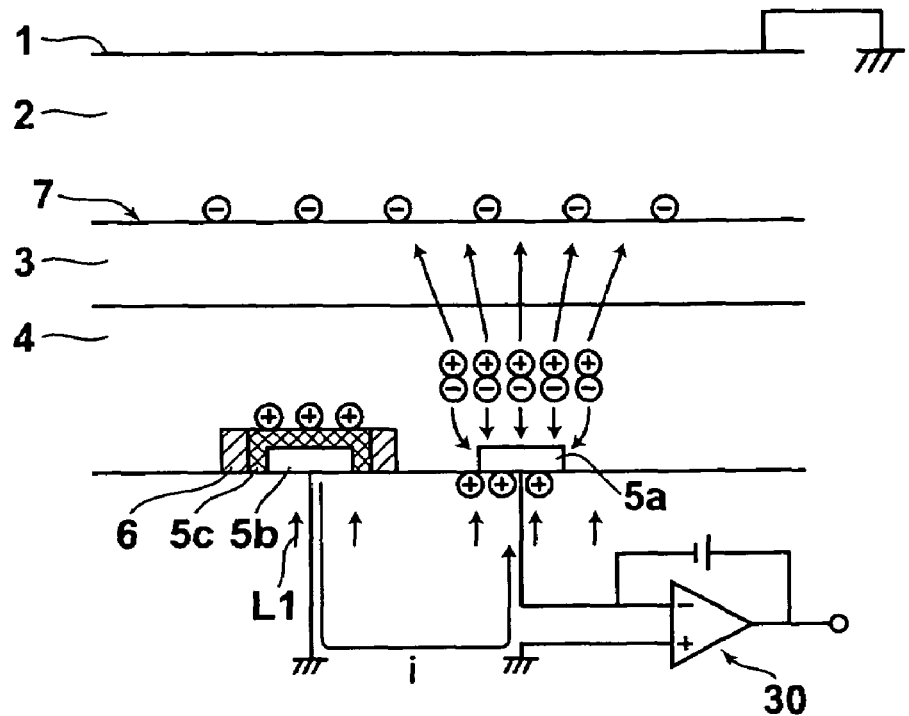
FIG. 4 is an explanatory diagram explaining the operation of the radiation image detector shown in FIG. 1 when a radiation image is read out therefrom.

Thereafter, with the first electrode layer 1 being grounded as shown in FIG. 4, readout light L1 is irradiated on the radiation image detector 10 from the side of the second electrode layer 5, which is transmitted through the first line electrodes 5*a* and irradiated on the readout photoconductive layer 4. The positive charges generated in the readout photoconductive layer 4 when irradiated with the readout light L1 combine with the latent image charges stored in the storage section 7, and the negative charges generated in the readout photoconductive layer 4 combine with positive charges charged on the first line electrodes 5*a* of the second electrode layer 5.

This negative and positive charge coupling causes electric currents to flow in a charge amplifier 30, which are integrated and detected as image signals, whereby image signals are read out from the radiation image detector 10 in proportion to the radiation image.

Here, in the present radiation image detector 10, the opaque line insulator is formed in the manner as described above, so that the readout light may be irradiated fully without interruption on the area of the readout photoconductive layer 4 adjacent to the side faces of each of the first line electrodes 5*a*, whereby charges in the readout photoconductive layer 4 may be fully discharged, whereby the readout efficiency is improved.

Further, the readout light is prevented from being irradiated on the area of the readout photoconductive layer 4 adjacent to the side faces of each of the second line electrodes 5*d*, and the electric charges in the area of the readout photoconductive layer 4 adjacent to the side faces of each of the second line electrodes 5*d* may be prevented from discharging, whereby the readout efficiency is improved.

Figure 5:
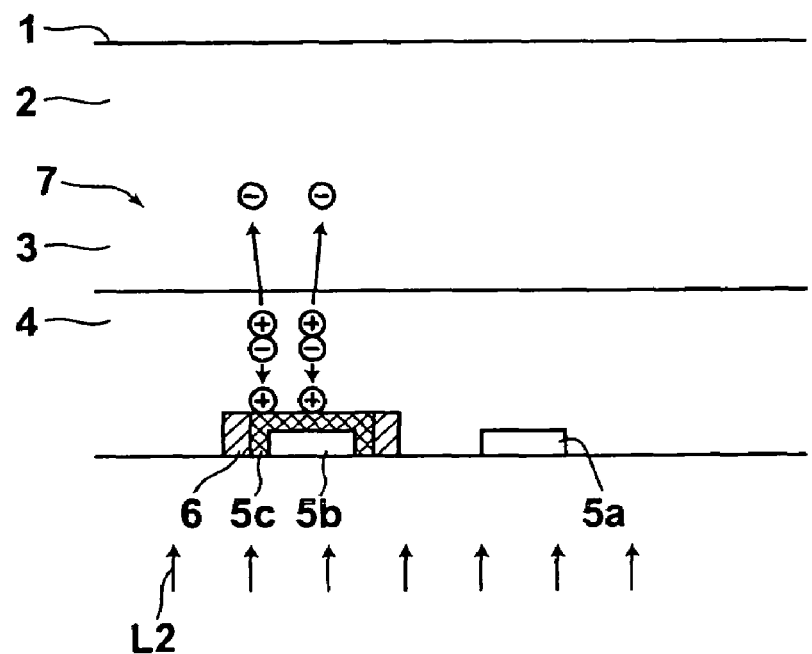
FIG. 5 is an explanatory diagram explaining the operation of the radiation image detector shown in FIG. 1 when residual charges are erased.

Thereafter, erasing light L2 is irradiated on the radiation image detector 10 for erasing residual charges remaining in the storage section 7 of the radiation image detector 10 after the radiation image is read out. As shown in FIG. 5, the erasing light L2 is irradiated on the radiation image detector 10 from the side of the second electrode layer 5, which is transmitted through the first line electrodes 5a and opaque line insulators 6 of the second electrode layer 5, and irradiated on the readout photoconductive layer 4. The erasing light L2 irradiated on the readout photoconductive layer 4 causes electric charge pairs to be generated therein, and positive charges of the electric charge pairs pass through the charge transport layer 3 to the storage section 7 where they combine with the residual charges and disappear, while the negative charges of the electric charge pairs combine with positive charges charged on the second line electrodes 5d and disappear.

Here, in the present radiation image detector 10, the opaque line insulators 6 are formed with a material that transmits the erasing light as described above, so that the residual charges may be erased satisfactorily in the manner as described above. In the present radiation image detector 10, the opaque line insulators 6 are formed with a material that transmits the erasing light, but if the erasing process is not performed, then the opaque line insulators 6 are not necessarily formed with a material that transmits the erasing light.

Further, as in the present radiation image detector 10, it is preferable that no insulation material, including the opaque line insulator 6, is provided on the upper surface of each of the second line electrodes 5d. The reason is that if such insulation material is present on the upper surface of the second line electrode 5d, electric charges remain on the surface of the insulation material and appear as a residual image on the image obtained in the next radiation image recording and reading out process.

Figure 6A:
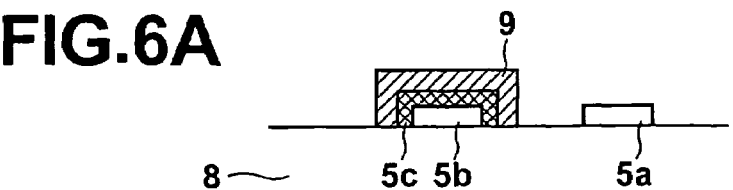
FIGS. 6A and 6B are explanatory diagrams explaining how to form an opaque line insulator in the radiation image detector of the present invention.
Figure 6B:
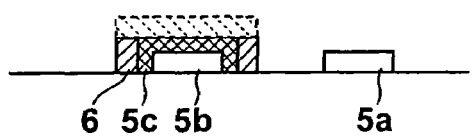

As for the method for forming the second line electrode 5d and the opaque line insulator 6 as in the present radiation image detector 10, first, for example, forming a first line electrode 5a and a transparent line electrode 5b using ITO or the like on a glass substrate 8 as shown in FIG. 6A. Then, providing an opaque film 5c over the transparent line electrode 5b by wet plating or the like, and coating the transparent line electrode 5b with the material of the opaque line insulator 6 to form a film 9. Thereafter, grinding the film 9 until the opaque film 5c appears on the upper surface as shown in FIG. 6B. The grinding described above may be conducted until the opaque film 5c appears on the surface, or further until the thickness of the opaque line insulator 6 and the opaque film 5c becomes a predetermined value.

Figure 7:
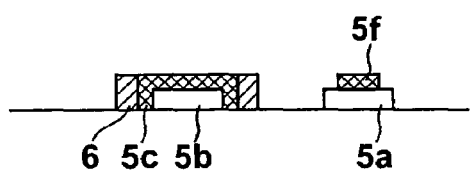
FIG. 7 is a drawing illustrating the opaque line insulator according to another embodiment.

Further, as shown in FIG. 7, a bus electrode 5f that blocks the readout light may be formed on the upper surface of the first line electrode 5a of the present radiation image detector 10. As for the material of the bus electrode 5f, for example, Al, Ag, Cu, or the like may be used. Provision of the bus electrode 5f reduces the linear resistance of the first line electrode 5a, which in turn reduces the thermal noise, whereby quality of the radiation image read out from the radiation image detector 10 may be improved. The bus electrode 5f needs to be provided at the central part of the upper surface of the first line electrode 5a excluding the side edge sections extending in the longitudinal direction thereof as shown in FIG. 7, in order not to interrupt the discharge of the electric charges in the area adjacent to the side faces of the first line electrode 5a. The bus electrode 5f may be formed simultaneously with the opaque film 8 in the process of forming the opaque film 8 shown in FIG. 6A.

Figure 9:
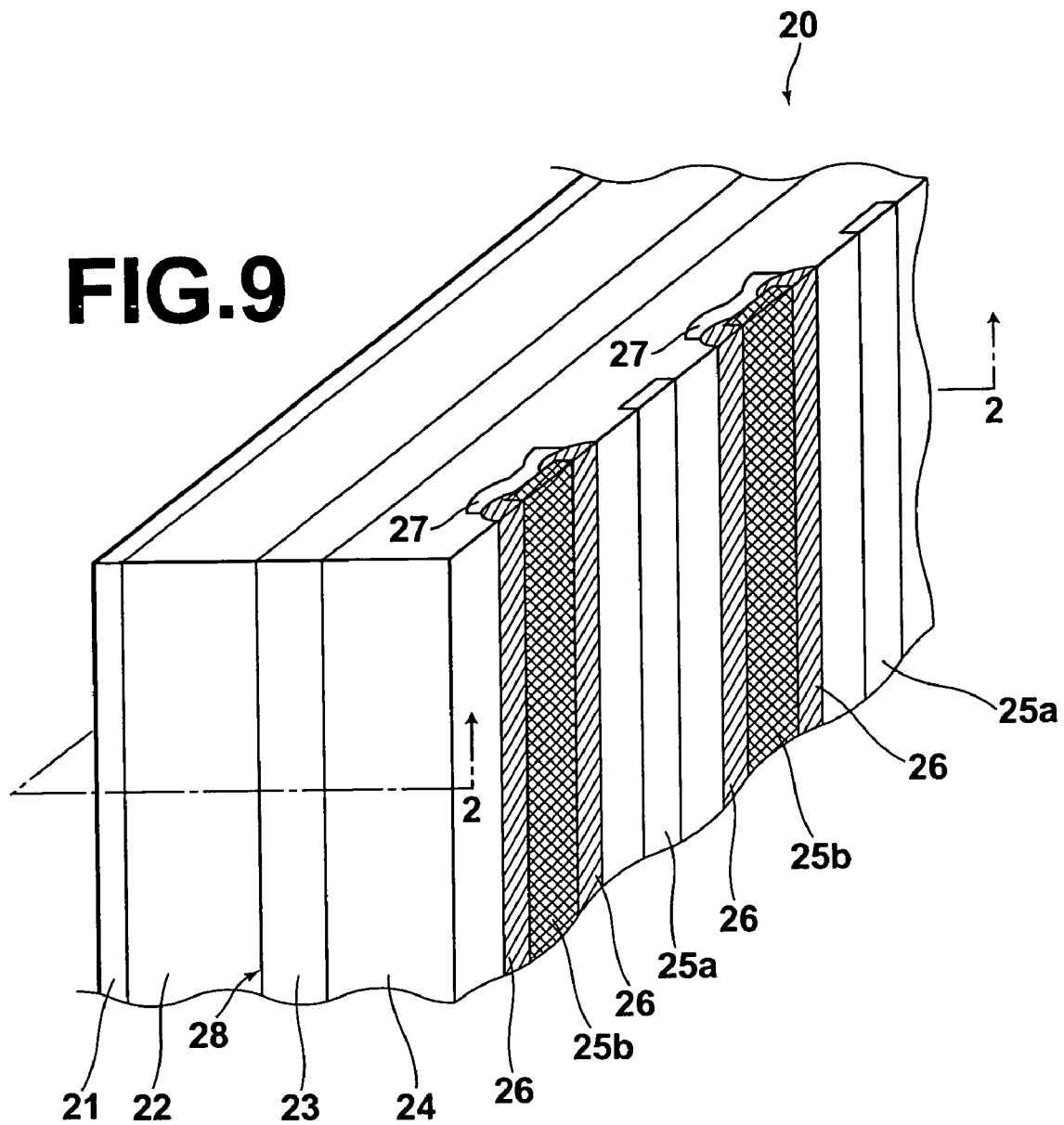
FIG. 9 is a schematic diagram of the radiation image detector according to a second embodiment of the present invention.

Hereinafter, the radiation image detector according to a second embodiment of the present invention will be described. FIG. 9 is a perspective view of the present radiation image detector, and FIG. 10 is a cross-sectional view thereof taken along the line 2-2 in FIG. 9.

Figure 10:
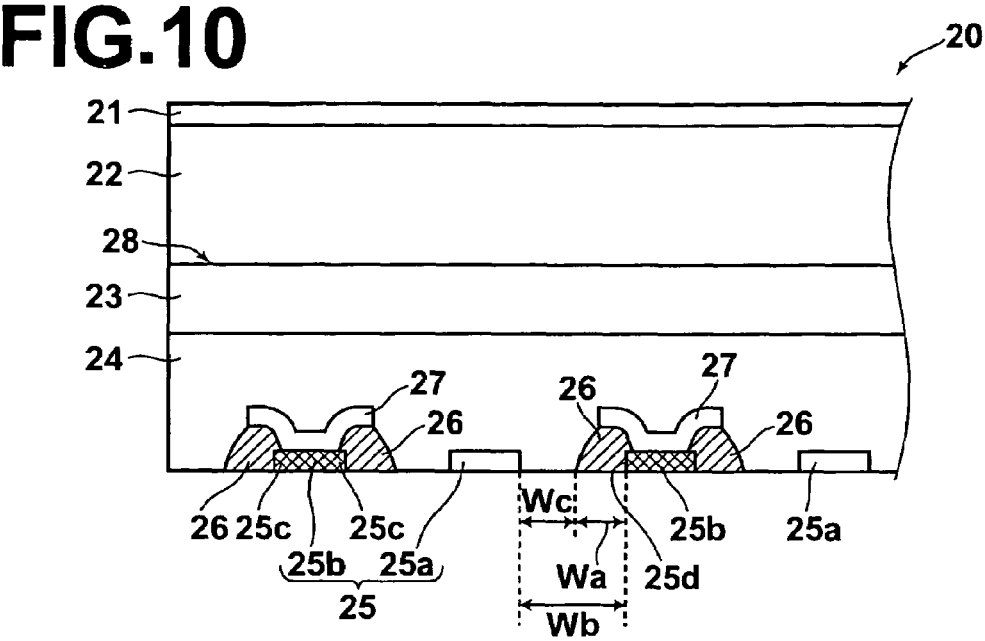
FIG. 10 is a cross-sectional view of the radiation image detector shown in FIG. 9 taken along the line 2-2 of FIG. 9.

As shown in FIGS. 9 and 10, the present radiation image detector 20 is constituted by a layer structure that includes the following layers in the order listed below: a first electrode layer 21 that transmits radiation representing a radiation image; a recording photoconductive layer 22 that generates electric charges when irradiated with the radiation transmitted through the first electrode layer 21; a charge transport layer 23 that acts as an insulator against the charges of either polarity and as a conductor for the charges of the opposite polarity generated in the recording photoconductive layer 22; a readout photoconductive layer 24 that generates electric charges when irradiated with readout light; and a second electrode layer 25 including a plurality of first line electrodes 25a that transmits the readout light, and a plurality of second line electrodes 25b that blocks the readout light, each of which is disposed between the first line electrodes 25a. In addition, a storage section 28 for storing the electric charges generated in the recording photoconductive layer 22 is formed between the recording photoconductive layer 22 and charge transport layer 23. Thus, a charge storage layer, which generates and stores electric charges when irradiated with a recording electromagnetic wave representing a radiation image, includes the first electrode layer 21, the recording photoconductive layer 22, the charge transport layer 23, and the storage section 28. The layers described above are built up on a glass substrate from the second electrode layer 25, but the glass substrate is omitted in FIGS. 9 and 10.

The first electrode layer 21 is identical to the first electrode layer 1 of the radiation image detector 10 according to the first embodiment described above.

The second electrode layer 25 includes the first line electrodes 25a and the second line electrodes 25d as described above. In addition, the first line electrodes 25a and the second line electrodes 25d are disposed alternately in parallel at a predetermined distance.

The first line electrode 25a is made of an electrically conductive material that transmits the readout light and erasing light to be described later. It may be made of any material as long as it has the properties described above. Such materials include, for example, ITO and IDIXO as used for the first electrode layer 21. Alternatively, the electrode 25a may be formed with a metal such as Al, Cr, or the like with a thickness that allows the readout light and the erasing light to be transmitted (e.g., around 10 nm).

The second line electrode 25b is made of an electrically conductive material that blocks the readout light. It may be formed with any material as long as it has the properties described above. For example, it may be formed with a material that blocks the readout light, such as Al or Cr, with a thickness which is sufficient to block the readout light.

In the present radiation image detector 20, an opaque line insulator 26 that blocks the readout light is provided at a side region adjoining to each side face 25c extending in the longitudinal direction of each second line electrode 25b. The opaque line insulator 26 is provided along each second line electrode 25b. The opaque line insulator 26 is made of an electrically insulative material which blocks the readout light and transmits the erasing light. The opaque line insulator 26 may be made of any material as long as it has the properties described above. If, for example, the readout light is blue light having a wavelength in the range from 400 nm to 480 nm, and the erasing light is red light having a wavelength in the range from 580 to 700 nm, a red insulation material, which is in complementary relationship with blue, may be used. Such material includes, for example, acrylate resin with diaminoanthraquino nilred dispersed therein, and the like. A preferred characteristic of the light transmittance of a material used for the opaque line insulator 26 when blue light is used as the readout light is shown in FIG. 8. If the readout light is red light having a wavelength in the range from 580 nm to 700 nm, and the erasing light is blue light having a wavelength in the range from 400 to 480 nm, a blue insulation material, which is in complementary relationship with red, may be used. Such material includes, for example, acrylate resin with copper phthalocyanine dispersed therein, and the like. That is, the materials that may be used for the opaque line insulator 26 are not limited to those described above, and any insulation material having the same color as the erasing light, which is in complementary color relationship with the wavelength of the readout light, may be used.

Further, the opaque line insulator 26 is formed such that a maximum width Wa measured from the side face 25c is smaller than the distance Wb between the first line electrode 25a and the second line electrode 25b. Here, the distance Wc between the first line electrode 25a and the opaque line insulator 26 is preferable to be greater than the wavelength of the readout light, and is more preferable to be around 2.5 μm. The maximum width Wa of the opaque line insulator 26 is preferable to be greater than or equal to the wavelength of the readout light. For example, if blue light is used as the readout light, the width Wa described above is preferable to be in the range approximately from 2 μm to 3 μm, and is more preferable to be around 2.5 μm. That is, the width Wa is preferable to be approximately five times as great as the wavelength of the readout light.

The present radiation image detector 20 further includes a third line electrode 27 provided along the upper surface of each second line electrode 25b for electrically connecting the area of the readout photoconductive layer 24 adjacent to the opaque line insulators 26 to the second line electrode 25b. The third line electrode 27 is formed such that it strides across the upper face of the opaque line insulators 26 and the upper face of the second line electrode 25b. The third line electrode 27 may be made of any material as long as it has electrical conductivity. Preferably, however, it is made of the same material as the first line electrode 25a. If that is the case, the third line electrodes 27 and the first line electrodes 25a may be formed in the same manufacturing process after the second line electrodes 25b and the opaque line insulators 26 are formed on the glass substrate. Further, the third line electrode 27 is preferable to be made of a material that transmits the erasing light.

The recording photoconductive layer 22, charge transport layer 23, and readout photoconductive layer 24 are respectively identical to the recording photoconductive layer 2, charge transport layer 3, and recording photoconductive layer 4 of the radiation image detector 10 according to the first embodiment described above.

Hereinafter, the operation of the present radiation image detector will be described.

Figure 11A:
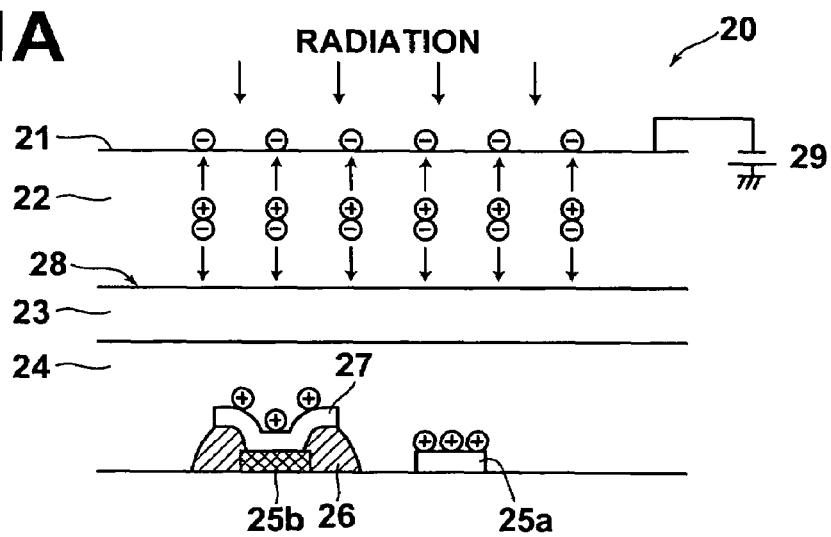
FIGS. 11A and 11B are explanatory diagrams explaining the operation of the radiation image detector shown in FIG. 9 when a radiation image is recorded thereon.

First, radiation is irradiated from a radiation source toward a subject with a negative high voltage being applied from a high voltage source 29 to the first electrode layer 21 of the radiation image detector 20 as shown in FIG. 11A, and the radiation transmitted through the subject and representing a radiation image of the subject is irradiated on the radiation image detector 20 from the side of the first electrode layer 21.

Figure 11B:
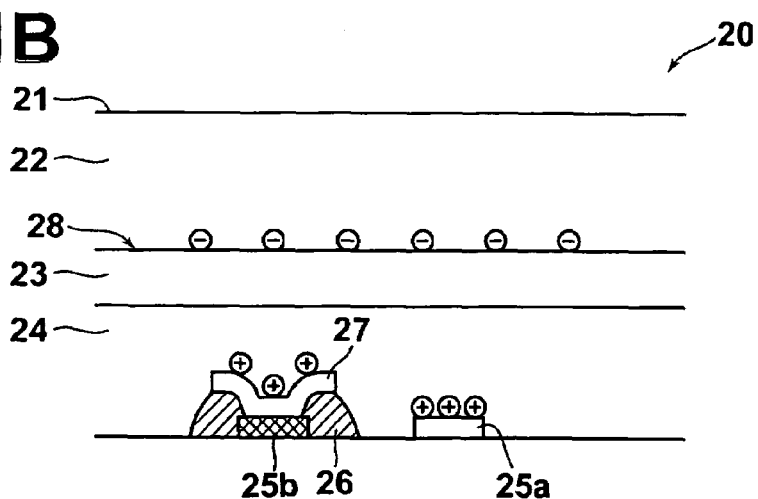

Then, the radiation irradiated on the radiation image detector 20 is transmitted through the first electrode layer 21, and irradiated on the recording photoconductive layer 22, which causes electric charge pairs to be generated in the recording photoconductive layer 22. The positive charges of the electric charge pairs combine with the negative charges charged on the first electrode layer 21 and disappear, while the negative charges of the electric charge pairs are stored in the storage section 28 formed at the interface between the recording photoconductive layer 22 and charge transport layer 23 as latent image charges, whereby the radiation image is recorded (FIG. 11B).

Figure 12:
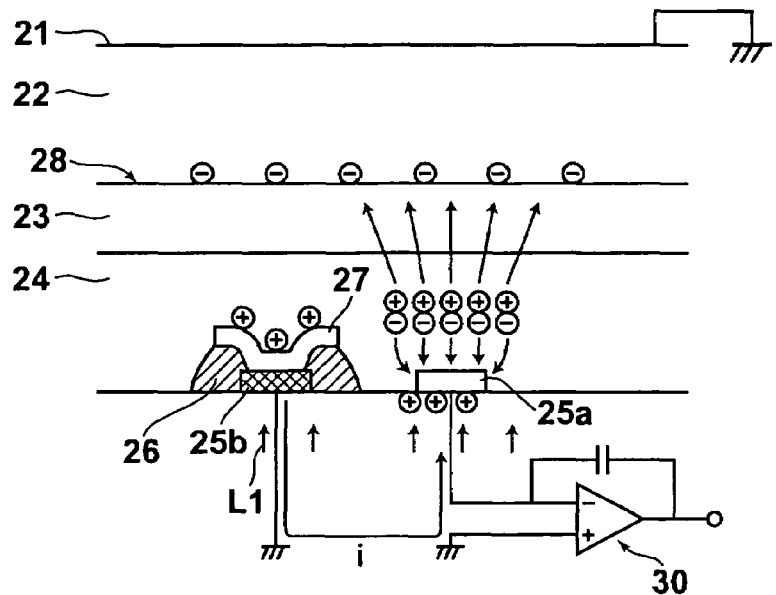
FIG. 12 is an explanatory diagram explaining the operation of the radiation image detector shown in FIG. 9 when a radiation image is read out therefrom.

Thereafter, with the first electrode layer 21 being grounded as shown in FIG. 12, readout light L1 is irradiated on the radiation image detector 20 from the side of the second electrode layer 25, which is transmitted through the first line electrodes 25a and irradiated on the readout photoconductive layer 24. The positive charges generated in the readout photoconductive layer 24 when irradiated with the readout light L1 combine with the latent image charges stored in the storage section 28, and the negative charges generated in the readout photoconductive layer 24 combine with positive charges charged on the first line electrodes 25a of the second electrode layer 25.

This negative and positive charge coupling causes electric currents to flow in a charge amplifier 30, which are integrated and detected as image signals, whereby image signals are read out from the radiation image detector 20 in proportion to the radiation image.

Here, in the present radiation image detector 20, the opaque line insulator is formed in the manner as described above, so that the readout light may be irradiated fully without interruption on the area of the readout photoconductive layer 24 adjacent to the side faces of each of the first line electrodes 25a, whereby electric charges in the readout photoconductive layer 24 may be fully discharged, whereby the readout efficiency is improved.

Further, the readout light is prevented from being irradiated on the area of the readout photoconductive layer 24 adjacent to the side faces of each of the second line electrodes 25b, and the electric charges in the area of the readout photoconductive layer 24 adjacent to the side faces of each of the second line electrodes 25b may be prevented from discharging, whereby the readout efficiency is improved.

Figure 13:
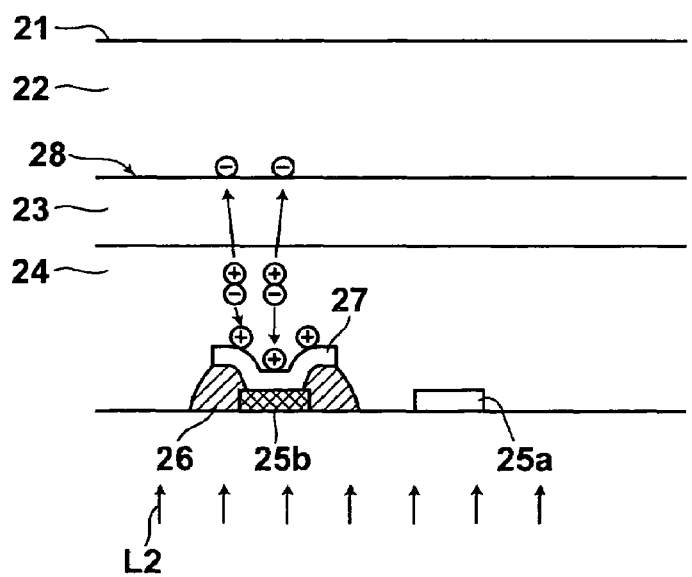
FIG. 13 is an explanatory diagram explaining the operation of the radiation image detector shown in FIG. 9 when residual charges are erased.

Thereafter, erasing light L2 is irradiated on the radiation image detector 20 for erasing residual charges remaining in the storage section 28 of the radiation image detector 20 after the radiation image is read out. As shown in FIG. 13, the erasing light L2 is irradiated on the radiation image detector 20 from the side of the second electrode layer 25, which is transmitted through the first line electrodes 25a and opaque line insulators 26 of the second electrode layer 25, and irradiated on the readout photoconductive layer 24. The erasing light L2 irradiated on the readout photoconductive layer 24 causes discharges to occur at the area of the readout photoconductive layer 24 adjacent to each of the third line electrodes 27 and electric charge pairs are generated, and positive charges of the electric charge pairs pass through the charge transport layer 23 to the storage section 28 where they combine with the residual charges and disappear, while the negative charges of the electric charge pairs combine with positive charges charged on the third line electrodes 27 and disappear.

According to the present radiation image detector 20, the opaque line insulators 26 are formed with a material that transmits the erasing light, and the third line electrodes 27 are also provided, so that discharges may be induced in the area of the readout photoconductive layer 24 adjacent to each of the third line electrodes 27 by the erasing light, whereby the residual charges may be erased satisfactorily. Further, if the third line electrodes 27 are formed with a material that transmits the erasing light, the residual charges may be erased more effectively.

In the present radiation image detector 20, the opaque line insulators 26 are formed with a material that transmits the erasing light, but if the erasing process is not performed, then the opaque line insulators 26 are not necessarily formed with a material that transmits the erasing light.

Figure 14:
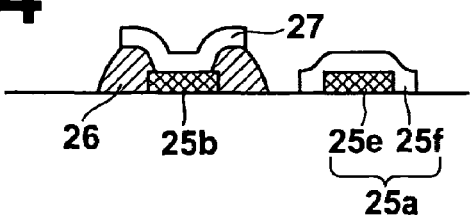
FIG. 14 is a schematic diagram of the radiation image detector according to another embodiment of the present invention.
Figure 15A:
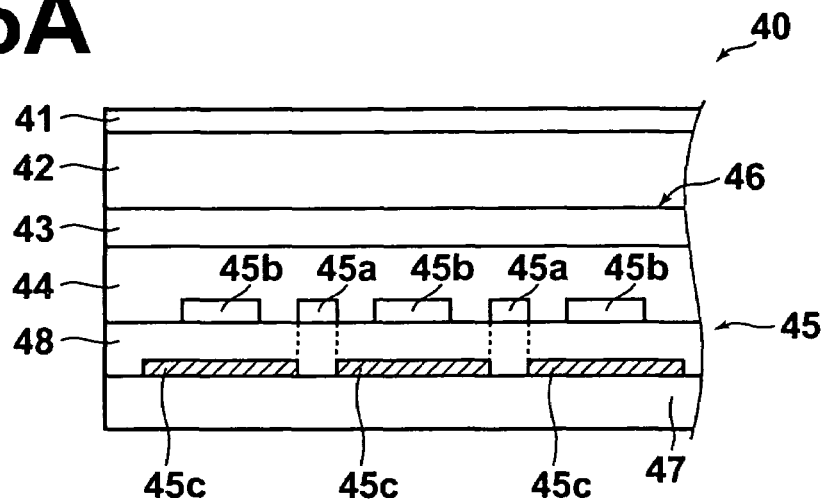
FIGS. 15A, 15B, and 15C are schematic diagrams of conventional radiation image detectors illustrating the construction thereof.
Figure 15B:
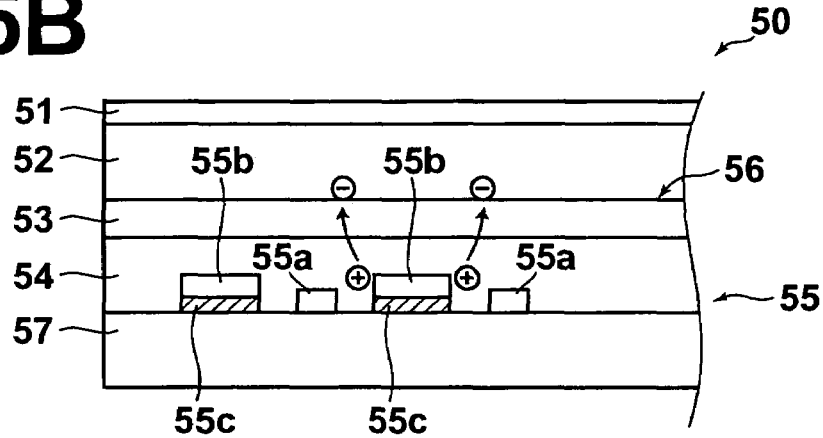
Figure 15C:
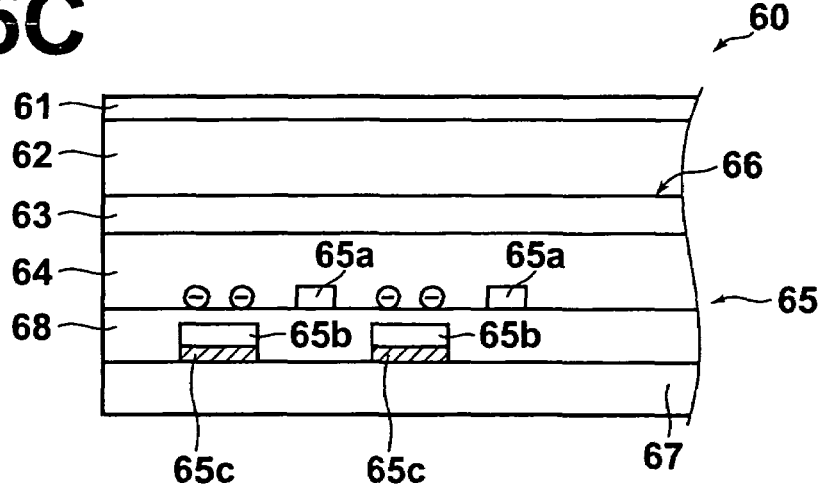

Further, each of the first line electrodes 25*a* of the present radiation image detector 20 may be formed with an opaque line electrode 25*e* that blocks the readout light and a film 25*f* that covers the upper and side faces of the opaque line electrode 25*e* as shown in FIG. 14. The film 25*f* maybe formed with a material that transmits the readout light, such as ITO, IDIXO. When the first line electrode 25*a* is formed in the manner as described above, the use of, for example, Al, Ag, Cu, or the like as the material of the opaque line electrode 25*e* may reduce the resistance value of the first line electrode 25*a* compared with the case in which the first line electrode 25*a* is formed with a single material that transmits the readout light, such as ITO, IDIXO, or the like. This may reduce the thermal noise, so that the quality of the radiation image read out from the radiation image detector 20 may be improved. When the first line electrodes 25*a* are formed in the manner as described above, it is preferable to form the opaque line electrodes 25*e* and the second line electrodes 25*b* using the same material. This allows the opaque line electrodes 25*e* and the second line electrodes 25*b* to be formed in the same manufacturing process. Further, the third line electrodes 27 and the films 25*f* may be formed in the same manufacturing process.

In the embodiments described above, the present invention is applied to what is known as the "direct conversion type" radiation image detector, in which a radiation image is recorded in the detector by receiving the radiation and directly converting the radiation to electric charges. The application of the present invention is not limited to this, and it may also be applied, for example, to what is known as the "indirect conversion type" radiation image detector, in which a radiation image is recorded by first converting the radiation to visible light, and then converting the visible light to electric charges.

The layer structure of the radiation image detector of the present invention is not limited to those of the embodiments described above, and another layer or layers may also be added.

What is claimed is:

1. A radiation image detector comprising a layer structure that includes the following layers in the order listed below:
    a charge storage layer that generates and stores electric charges when irradiated with a recording electromagnetic wave representing a radiation image;
    a photoconductive layer that generates electric charges when irradiated with readout light; and
    an electrode layer including a plurality of first line electrodes that transmits the readout light and a plurality of second line electrodes that blocks the readout light disposed alternately in parallel with each other at a predetermined distance, wherein:
    each of the plurality of second line electrodes includes an opaque line insulator that blocks the readout light and is provided on each side face extending in the longitudinal direction thereof; and
    the opaque line insulator has a width which is smaller than the distance between the first and second line electrodes.

2. The radiation image detector according to claim 1, wherein:
    the photoconductive layer further generates electric charges when irradiated with erasing light for erasing residual charges remaining in the charge storage layer; and
    the opaque line insulator transmits the erasing light.

3. A radiation image detector comprising a layer structure that includes the following layers in the order listed below:
    a charge storage layer that generates and stores electric charges when irradiated with a recording electromagnetic wave representing a radiation image;
    a photoconductive layer that generates electric charges when irradiated with readout light; and
    an electrode layer including a plurality of first line electrodes that transmits the readout light and a plurality of second line electrodes that blocks the readout light disposed alternately in parallel with each other at a predetermined distance, wherein:
    each of the plurality of second line electrodes includes an opaque line insulator that blocks the readout light only at a side region adjoining each side face extending in the longitudinal direction thereof, and a third line electrode for electrically connecting the area of the photoconductive layer adjacent to the opaque line insulators along the upper face thereof and the upper face of the opaque line insulators; and
    a maximum width of the opaque line insulator measured from the side face extending in the longitudinal direction of the second line electrode is smaller than the distance between the first and second line electrodes.

4. The radiation image detector according to claim 3, wherein:
    the photoconductive layer further generates electric charges when irradiated with erasing light for erasing residual charges remaining in the charge storage layer; and
    the opaque line insulator transmits the erasing light.

5. The radiation image detector according to claim 4, wherein the third line electrode transmits the erasing light.

* * * * *